June 21, 1966 R. J. VAN WECHEL 3,257,505

AUTOMATIC TRACKING TELEVISION SYSTEM

Filed Sept. 27, 1962 2 Sheets-Sheet 1

AUTOMATIC TRACKING TELEVISION SYSTEM

Filed Sept. 27, 1962 2 Sheets-Sheet 2

INVENTOR.
ROBERT J. VAN WECHEL
BY
Christie, Parker & Hale
ATTORNEYS.

United States Patent Office 3,257,505
Patented June 21, 1966

3,257,505

AUTOMATIC TRACKING TELEVISION SYSTEM

Robert J. Van Wechel, Yorba Linda, Calif., assignor to Lear Siegler, Inc., Anaheim, Calif., a corporation of Delaware Filed Sept. 27, 1962, Ser. No. 226,532
12 Claims. (Cl. 178—6.8)

Figure 1:
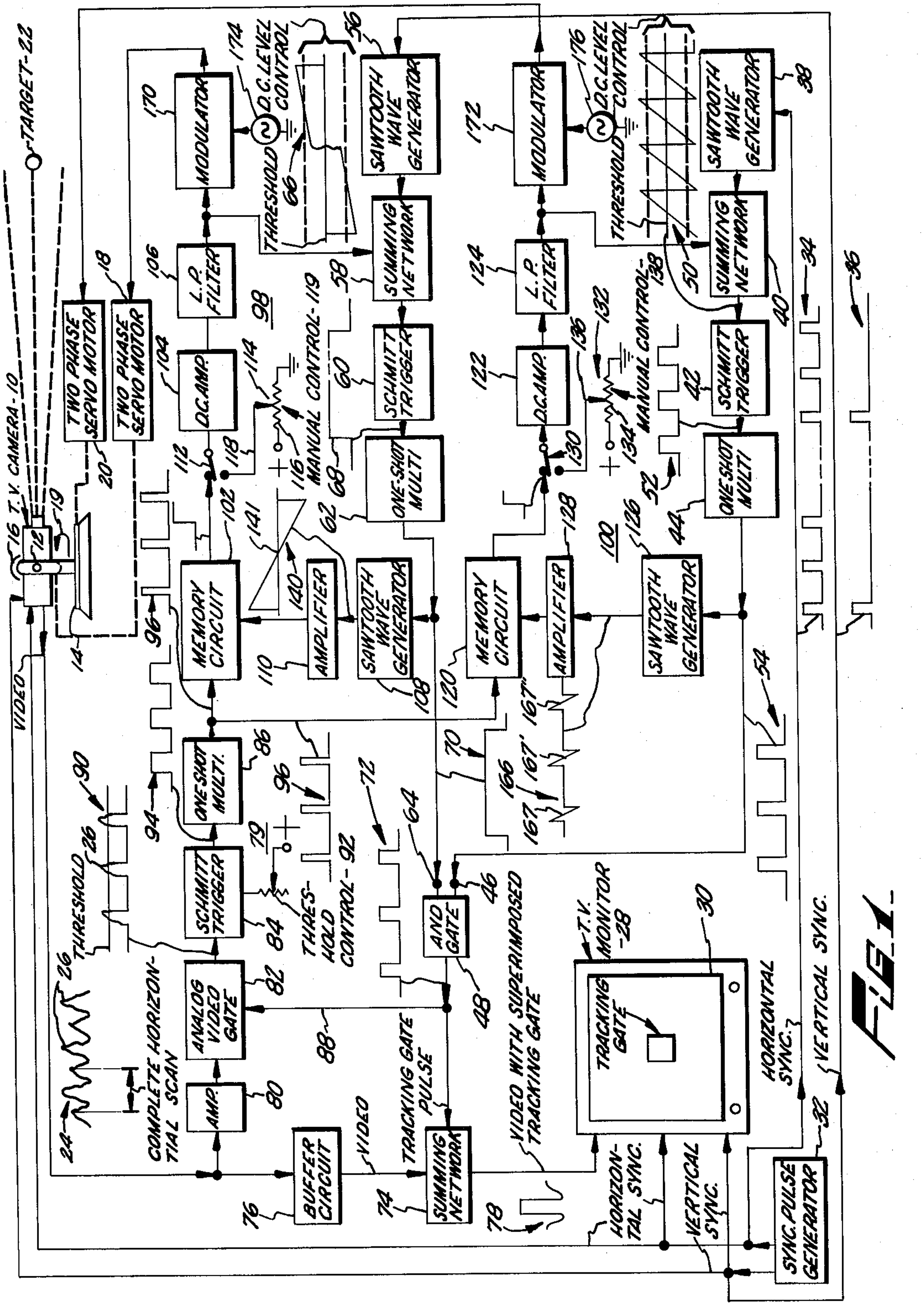

This invention relates to an improved television system for automatically tracking moving targets.

Due to the capability of television systems to distinguish moving targets from background clutter, automatic tracking television systems are presently employed in both military and industrial guidance and surveillance systems. The television systems presently in use to track a moving target basically include a movable television camera for viewing the moving target and a television monitor for displaying the target on a viewing screen. The scanning operation of the camera and the monitor are synchronized by common horizontal and vertical synchronizing pulses. The synchronizing pulses are also utilized to control circuitry for generating a tracking gate pulse signal which when superimposed on the video output signal from the camera produces a rectangular tracking gate or window on the viewing screen of the monitor. The tracking gate is movable on the viewing screen to follow a moving target in response to variations in the magnitude of a pair of biasing control signals which are also applied to the circuitry for generating the tracking gate pulse.

In the presently existing television tracking systems, the control signals are developed by critical and closely controlled processing of the video output signal developed by the television camera. The electrical control circuitry utilized in such processing of the video signal in addition to requiring the use of electrical circuit components capable of passing video signals without distortion, also includes a number of high gain amplifiers having automatic gain control. The control circuitry thus requires critical design to maintain the quality of the video signal and is relatively expensive to implement.

In view of this, the present invention provides an automatic tracking television system employing a simplified control circuit design to develop the control signals necessary to the continuous tracking of a moving target.

Basically the simplified control circuitry includes means responsive to the tracking gate pulse for gating a portion of the video output signal developed by the television camera to a device having a predetermined threshold of operation. The video signal causes the threshold device to generate a pulse signal at the leading edge of the signal component in the video representing the moving target. The pulse signal is applied to a pair of memory circuits. In response to the pulse signal the memory circuits develop a first and a second control voltage signal respectively. One of the control voltage signals has a magnitude which is a function of the horizontal position of the target signal component of the video output signal in the horizontal scanning of the viewing screen and hence is proportional to the horizontal position of the target as viewed by the camera. The other control signal has a magnitude which is a function of vertical position of the tracking signal component of the video output signal in the complete scanning of the viewing screen and is hence proportional to the vertical position of the target as viewed by the camera. Thus, as the target moves, the magnitude of the control signals change in a like manner.

The control signals are simultaneously stored in the memory circuits and applied to the circuitry for developing the tracking gate pulse to control the time generation of the tracking gate pulse and hence the position of the tracking gate on the viewing screen to follow the moving target.

By utilizing means for generating a pulse signal indicative of the timed occurrence of the target signal component in the video output signal in combination with the memory circuits, the present invention eliminates the requirement for high gain amplifiers and relaxes the frequency requirements of the electrical components comprising the control circuitry for developing the desired biasing control signals. Accordingly, the simplified control circuit of the present invention is substantially less expensive to implement and maintain than the control circuitry employed in the presently existing automatic television systems.

Figure 2:
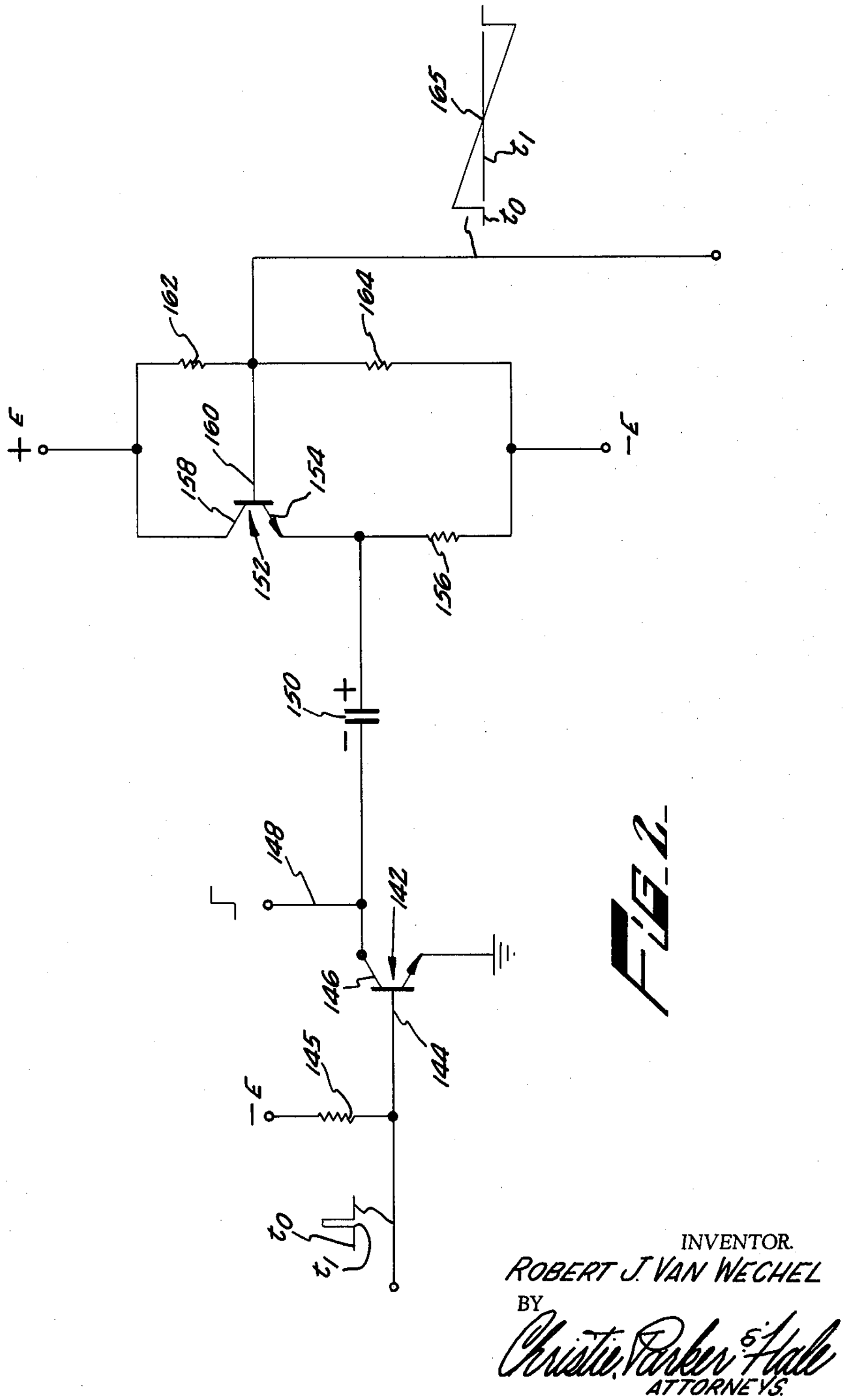

The above as well as other features of the present invention may be more clearly understood by reference to the following detailed description when considered with the drawings in which:

FIGURE 1 is a block, diagram representation of an automatic tracking television system including the control circuitry of the present invention; and FIGURE 2 is a schematic representation of one form of the memory circuit utilized in the control circuit of the present invention.

Referring in detail to FIGURE 1, the automatic tracking television system as illustrated includes a television camera 10 supported by a vertical support member 12 upon a platform 14. The support member 12 is movable, as indicated by the arrow 16, to a position controlled by a two phase servo motor 18. The platform 14 is rotatable, as indicated by the arrow 19, to pivot the camera 10 to a direction controlled by a two phase servo motor 20. Thus, the operation of the servo motors 18 and 20 controls the focal direction of the camera 10.

As will be hereinafter described, the servo motors are excited to cause the camera 10 to continuously follow a moving target 22. The camera 10, upon viewing the target 22, develops a video output signal indicated by the waveform 24 including a target signal component 26 due to the target 22. The target signal component 26 possesses a magnitude greater than the remainder of the signal components comprising the video output signal developed by the camera 10. Thus the target signal component may be distinguished from the remaining signal components of the video output signal comprising background clutter.

To display the video output signal developed by the camera 10 including a target signal component 26, the television system includes a television monitor 28. The monitor 28 includes a viewing screen 30 and receives the video output signal from the camera 10.

Utilizing conventional television techniques the scanning operation of the television monitor 28 is synchronized with the scanning operation of the television camera 10 by horizontal and vertical synchronizing pulses generated in a "sync" pulse generator 32. The horizontal and vertical synchronizing pulses generated by the sync pulse generator 32 have waveforms similar to those represented at 34 and 36, respectively. For each horizontal scan of the camera 10 and the monitor 28 a horizontal sync pulse is generated while a single vertical sync pulse is generated for each complete scanning operation of the camera 10 and the monitor 28. In practice this means that approximately 525 horizontal synchronizing pulses are generated for each two vertical synchronizing pulses.

As previously mentioned, the synchronizing pulses in addition to synchronizing the scanning operation of the monitor 28 and the camera 10 also provide means for controlling circuitry to develop a tracking gate pulse which when superimposed on the video signal applied to the monitor develops a rectangular tracking gate or window for following the movement of the target 22 on the viewing screen 30. To develop such a tracking gate pulse, the control circuitry responsive to the horizontal synchronizing pulses includes a sawtooth wave generator 38, a summing network 40, a Schmitt trigger circuit 42 and a one shot multivibrator 44 connected in series between the sync pulse generator 32 and an input terminal 46 of an AND gate 48.

In response to each horizontal sync pulse generated by the sync pulse generator 32 a ramp signal is generated by the sawtooth wave generator 38 and applied to the summing network 40. At the summing network 40 the D.C. level of the ramp signal is controlled in a manner hereinafter described to selectively control the timed occurrence of the tracking gate pulse and hence the position of the tracking gate on the viewing screen 30 of the monitor 28.

The ramp signal, as modified by the summing network 40, is applied to the Schmitt trigger 42. The Schmitt trigger 42 possesses a predetermined threshold voltage of operation and becomes conductive to generate a pulse signal when the input voltage applied thereto exceeds the predetermined threshold. Thus as illustrated by the waveform 50 representing the output signal from the summing network 42, when the threshold is exceeded by the ramp signal, the Schmitt trigger fires to generate a pulse signal as represented by the waveform 52.

The pulse signals generated by the Schmitt trigger 42 are applied to the one shot multivibrator 44 which develops a pulse signal having a predetermined amplitude and width at the leading edge of each pulse developed by the Schmitt trigger 42. The output signal generated by the one shot multivibrator 44 is as illustrated by the waveform 54. The output of the multivibrator 44 is applied to the input terminal 46 of the AND gate 48.

In a similar manner, the control circuitry responsive to the vertical synchronizing pulses includes a sawtooth wave generator 56, a summing network 58, a Schmitt trigger 60, and a one shot multivibrator 62 connected in series between the synch pulse generator 32 and an input terminal 64 of the AND gate 48.

In response to each vertical synchronizing pulse the sawtooth wave generator 56 develops a ramp signal which is applied to the summing network 58. The summing network 58 functions in a manner hereinafter described to control the D.C. level of the ramp signal to provide means for selectively controlling the time generation of the tracking gate pulse. The waveform of the output signal from the summing network 58 is as illustrated at 66.

The output signal from the summing network 58 is applied to the Schmitt trigger 60. The schmitt trigger 60 possesses a predetermined threshold voltage of operation and becomes conductive to generate a pulse signal during the time duration for which an input voltage applied thereto exceeds the threshold voltage of operation. The output voltage developed by the Schmitt trigger in response to the ramp signal from the summing network 58 is as illustrated by the waveform 68.

The pulse signals generated by the Schmitt trigger 60 are applied to the one shot multivibrator 62 which develops a pulse signal having a predetermined amplitude and time duration at the leading edge of each pulse signal developed by the Schmitt trigger 60. The waveform of the output signal developed by the multivibrator 62 is as illustrated at 70. As represented, the time duration of the output signal developed by the multivibrator 62 is many times greater than the time duration of the output signal generation by the multivibrator 44. The output of the multivibrator 62 is applied to the input terminal 64 of the AND gate 48.

Due to the relationship between the periodicity of the horizontal and vertical synchronizing pulses, a pulse signal is generated by the multivibrator 44 during each horizontal scan of the monitor 28 while a single pulse signal is developed by the multivibrator 62 during each complete scanning operation of the monitor 28. Thus, since the pulse signals developed by the multivibrators 44 and 62 are applied to the AND gate 48, pulse signals are passed by the AND gate 48 only during the time duration of the pulse signal generated by the multivibrator 62. In particular, a pulse signal is passed by the AND gate 48 for each horizontal scan of the monitor 28 during the pulse signal from the multivibrator 62 and at the timed occurrence of the pulse signals generated by the multivibrator 44.

Pulse signals passed by the AND gate form the tracking gate pulses and are illustrated by the waveform 72. Since a tracking gate pulse occurs only upon the simultaneous occurrence of the pulse signals from the multivibrators 62 and 44, the time duration of the tracking gate pulses equals the time duration of the pulse signals generated by the multivibrator 44. Further, by selective control of the time during each horizontal scan that the multivibrator 44 generates a pulse signal, the timed occurrence of the tracking gate pulse in the horizontal scan of the monitor 28 is likewise controlled. In addition, by controlling the time during the complete scanning operation of the multivibrator 62 generates a pulse signal, the time during a complete scan of the monitor 28 that the tracking gate pulses are generated may be selectively controlled. As will be described, such control is obtained by selectively controlling the D.C. level of the ramp signals in the summing networks 40 and 58 to provide selective positioning control of the rectangular tracking gate or window on the viewing screen 30 of the monitor 28.

To form the tracking gate or window on the viewing screen 30, the tracking gate pulses are applied to a summing network 74. The summing network 74 also receives the video output signal developed by the camera 10 which is applied to the summing network through a buffer circuit 76. The buffer circuit 76 may take the form of an impedance transforming device such as an emitter follower and functions to isolate the video output signal as generated by the camera from the tracking gate pulses prior to summing in the summing network 74. The tracking gate pulses are superimposed on the video signal in the summing network 74 to form a composite video signal which is, in turn, applied to the monitor 28.

The conventional scanning operation of the television monitor 28 produces a picture display of the composite video signal on the viewing screen 30. During the particular scans of the viewing screen for which the tracking gate pulse is included in the composite video signal, as represented by the waveform 78, a pulse signal is displayed on the viewing screen 30. As illustrated by the waveform 72, a number of tracking gate pulses are generated on consecutive horizontal scans. Thus a series of vertically displaced pulse signals are displayed on the viewing screen 30 to develop the rectangular tracking gate or window on the viewing screen. Since, as previously described, the time duration of the tracking gate pulses equals the width of the pulse signals generated by the multivibrator 44, the pulse width of the pulses generated by the multivibrator 44 control width of the tracking gate on the viewing screen 30.

Also, since the number of consecutive tracking gate pulses in a complete scanning of the monitor 28 is controlled by the time duration of the pulse signal generated by the multivibrator 62, the pulse signal generated by the multivibrator 62 controls the height of the tracking gate. Accordingly, changes in the time duration of the pulse signals generated by the multivibrators 44 and 62 produce corresponding variations in the size of the tracking gate.

As described briefly above, the particular time during the complete scanning of the monitor 28 as well as a particular time during the horizontal scanning of the monitor at which the tracking gate pulses are formed is under the control of the timed generation of the pulse signals by the multivibrators 62 and 44, respectively. Thus by selective control of the multivibrators 44 and 62 the position of the tracking gate on the viewing screen 30 may also be controlled. In the tracking television system this results in selective control of the position of the tracking gate to follow movements of the target 22 viewed by the camera 10.

To selectively control the multivibrators 44 and 62 to provide such selective positioning control of the tracking gate, control signals are applied to the summing networks 40 and 58. The control signals as applied to the summing networks 40 and 58 respectively, have a magnitude proportional to the horizontal and vertical position of the target 22 as viewed by the camera 10. As the target moves, the magnitude of the control signals change in a like manner. The control signals thus applied to the summing networks 40 and 58 vary the D.C. levels of the ramp signals generated by the sawtooth wave generators 38 and 56, respectively, in accordance with variations in the position of the target 22 as viewed by the camera 10. Changes in the D.C. level of the ramp signal generated by the sawtooth wave generator 38 produce corresponding changes in the time during each horizontal scan at which the input voltage to the Schmitt trigger 42 exceeds the threshold of operation as indicated by the dotted lines in the waveform 50. This produces a change in the timed firing of the Schmitt trigger 42 to, in turn, change the time during each horizontal scan at which the multivibrator 44 develops a pulse signal and hence the horizontal position of the tracking gate.

Changes in the D.C. level of the ramp signal generated by the sawtooth wave generator 56 produce corresponding changes in the time during the complete scanning operation of the monitor 28 at which the input voltage to the Schmitt trigger 60 exceeds the threshold of operation as indicated by the dotted lines in the waveform 66. This produces a change in the timed firing of the Schmitt trigger 60 to, in turn, change the time during each complete scanning operation at which the multivibrator 62 develops a pulse signal and hence the vertical positioning of the tracking gate.

Accordingly, the changes in the magnitude of the control signals in response to the movements of the target 22 produce a corresponding movement of the tracking gate to track the moving target.

To develop the control signals for selectively controlling the position of the tracking gate on the viewing screen 30, the automatic tracking television system in accordance with the present invention, includes a control circuit comprising a gating circuit arrangement 79 for selectively gating a portion of the video output signal to a pair of closed loop circuits 98 and 100. The closed loop circuits develop the control signals in response to the output of the gating circuit 79.

By way of example, the gating circuit 79, as illustrated, includes an amplifier 80 for amplifying the video output signal developed by the camera 10, an analog video gate 82, a Schmitt trigger 84, and a one shot multivibrator 86 connected in series between the camera 10 and the closed loop circuits 98 and 100.

The video signal amplified by the amplifier 80 is applied to the analog gate 82. The analog gate 82 is a conventional AND gate circuit for passing video signals and is controlled by the tracking gate pulses applied thereto by the line 88. Thus, during each tracking gate pulse a portion of the video output signal is passed by the analog gate 82 to the Schmitt trigger 84. By selectively controlling the timed occurrence of the tracking gate pulses, as described, the target signal component 26 appears in the video output signal during the time duration of each tracking gate pulse. The portion of the video signal passed by the analog gate 82 therefore likewise includes the target signal component as illustrated by the waveform 90.

The Schmitt trigger 84 to which the gated portion of the video output signal is applied, includes a threshold control 92 illustrated as including a variable resistor having a movable arm coupled to a source of positive potential. A threshold control 92 establishes the threshold of operation of the Schmitt trigger 84 at a predetermined level. When the gated video signal applied to the Schmitt trigger 84 exceeds the threshold voltage the Schmitt trigger develops a pulse signal. With the threshold of the Schmitt trigger established, as illustrated in the waveform 90, the Schmitt trigger generates a pulse signal at the leading edge of the target signal component 26 exceeding the threshold of operation of the schmitt trigger. The waveform of the output signal thus developed by the Schmitt trigger 84 is represented at 94.

The output pulse signal developed by the Schmitt trigger 84 is applied to the multivibrator 86. The multivibrator 86 develops a pulse signal at the leading edge of each pulse signal generated by the trigger 84 having a predetermined magnitude and pulse width as illustrated by the waveform 96. The pulse signals developed by the multivibrator 86, which may be termed "trigger" pulse signals, are applied to the closed loop circuits 98 and 100, respectively.

As illustrated, the closed loop circuit 98 includes a memory circuit 102, a direct current amplifier 104, a low pass filter 106, the summing network 58, Schmitt trigger 60, multivibrator 62, a sawtooth wave generator 108, and an amplifier 110 connected in a series loop. Positioned between the memory circuit 102 and the D.C. amplifier 104 is a two pole switch 112 normally connecting the memory circuit directly to the D.C. amplifier. When the switch 112 is thrown, the circuit connection between the memory circuit 102 and the D.C. amplifier 104 is broken and the D.C. amplifier is coupled to a manual control arrangement 119. The manual control 119 comprises a potentiometer 114 including a resistor 116 connected between a source of positive potential and ground and a movable arm 118.

Similarly, the closed loop 100 includes a memory circuit 120, a D.C. amplifier 122, a low pass filter 124, the summing network 40, Schmitt trigger 42, multivibrator 44, a sawtooth wave generator 126, and an amplifier 128 connected in a series loop. Normally connecting the memory circuit 120 to the D.C. amplifier 122 is a two pole switch 130. When the switch 130 is thrown, the series connection between the memory circuit 120 and the D.C. amplifier 122 is broken and the D.C. amplifier is connected to a manual control arrangement 138. The manual control 138 comprises a potentiometer 132 including a resistor 134 connected in series between a source of positive potential and ground and a movable arm 136.

The manual control 138 together with the manual control 119 provides means for initially positioning the tracking gate over the moving target as displayed on the viewing screen 30 of the monitor 28.

As described, when the switches 112 and 130 are thrown, the D.C. amplifiers 104 and 122 are connected directly to the manual control circuits 119 and 138. By selectively varying the position of the movable arms 118 and 136 along the associated resistors 116 and 134, the magnitude of the direct current voltage applied to the amplifiers 104 and 122 is selectively varied. The direct current signals developed by the manual control arrangement 119 and 138 are amplified by the amplifiers 104 and 122 and passed through the low pass filters 106 and 124 to the summing networks 58 and 40, respectively. At the summing network 58, the direct current voltage varies the D.C. level of the ramp signal generated by the generator 56 to vary the time during each complete scanning of the monitor 28 at which the multivibrator 62 generates an output pulse. This, in turn, causes the vertical position of the tracking gate on the viewing screen 30 to change, as previously described. Similarly, the direct current voltage applied to the summing network 40 varies the D.C. level of the ramp signals generated by the generator 38 to vary the time during each horizontal scan of the monitor 28 at which the multivibrator 44 generates its output pulses. This in turn causes the horizontal position of the tracking gate displayed in the viewing screen 30 to change.

Accordingly, by manually controlling the magnitude of the voltage signals developed by the potentiometers 114 and 132 an operator may selectively position the tracking gate on the viewing screen 30 to initially cover the target 22 as displayed on the viewing screen. For small or distant targets the tracking gate may be selectively positioned such that the target is initially at the center of the tracking gate.

With the tracking gate encompassing the target, the switches 112 and 130 may be returned to their normal position to provide a circuit connection between the memory circuits 102 and 120 and the associated D.C. amplifiers 104 and 122 to place the television system under automatic tracking control as provided by the closed loops 98 and 100.

To provide automatic vertical tracking control, in the closed loop 98 the output pulse from the multivibrator 62 is applied to the sawtooth wave generator 108. The sawtooth wave generator 108 develops a ramp signal during the time duration of the output pulse from the multivibrator 62 as illustrated by the waveform 140. The ramp signal from the generator 108 is amplified by the amplifier 110 and applied to the memory circuit 102. The memory circuit 102 also receives the trigger pulses generated by the multivibrator 86.

In general, the memory circuit 102 is responsive to the ramp signal developed by the generator 108 and a trigger pulse and together with the amplifier 104 and the low pass filter 106 develops the aforementioned control signal having a magnitude proportional to the vertical position of the target 22 as viewed by the camera 10.

More particularly, depending upon whether the target as displayed on the viewing screen 30 envelops the tracking gate or is relatively small or distant and initially centered in the middle of the tracking gate, vertical movement of the target 22 relative to the camera 10 causes either a change in the number of horizontal scans of the viewing screen 30 forming the tracking gate which include the target signal component 26 or a change in the particular horizontal scans which include the target signal component. Thus, the number of trigger pulses and/or the timing thereof as generated during the series of trigger pulses change in a like manner. Accordingly, by constructing the memory circuit 102 to be responsive to changes to the number and time position of the trigger pulses occurring during the series of tracking gate pulses the memory circuit 102 develops an output signal which is a function of the vertical position of the target signal component of the video output signal in the complete scanning of the viewing screen 30 and hence the vertical position of the target 22 relative to the camera 10.

In the embodiment of the present invention illustrated in FIGURE 1, to provide means for generating such an output signal the ramp signal 140 is utilized as a time base reference signal, the relative zero crossing thereof 141 acting as a reference time during the pulse signal from the multivibrator 160 and hence as a reference time during the series of tracking gate pulses as passed by the AND gate 48.

In response to each trigger pulse the memory circuit 102 develops a voltage signal, the magnitude and polarity of which is proportional to the time displacement of the trigger pulse from the reference time. Thus, the greater the time displacement, the greater the magnitude of the voltage signal. In addition, those trigger pulses which precede the reference time are of the first polarity while those following the reference time are of an opposite polarity. Accordingly, if the target is vertically centered in the tracking gate or if the target envelops the entire tracking gate, a resultant zero output voltage is developed over the time duration of the series of tracking gate pulses. However, with vertical movement of the target 22 which causes the target, as displayed, to depart from its central location in the tracking gate the resultant output voltage changes in a magnitude and sense corresponding to the amount and direction of vertical movement of the target.

For example, if the target 22 moves upward relative to the camera 10 a change occurs in the horizontal scans of the viewing screen 30 forming the tracking gate which includes the target signal components. If the target 22 is small or distant from the camera 10 earlier horizontal scans forming on the tracking gate acquire the target signal component while later horizontal scans lose the target signal component causing a change in the time position of the trigger pulses relative to the reference which in turn effect a change in the number of trigger pulses preceding and following the reference time. If the target 22 is large or so near to the camera 10 as to completely envelop the tracking gate, vertical movement causes later horizontal scans forming the tracking gate to lose the target signal component which produces a change in the number of trigger pulses preceding and following the reference time. Thus, in either case the resultant of the output voltage signal developed during the series of tracking gate pulses has a magnitude proportional to the amount of vertical displacement of the target 22 relative to the camera 10 and a polarity indicative of the direction of the displacement of the target from the center of the tracking gate.

To develop such a time averaged resultant output signal from the discrete voltage signals developed by the memory circuit 102, the output from the memory circuit 102 is amplified by the D.C. amplifier 104 and applied to the low pass filter 106. The low pass filter 106, in effect, integrates the voltage signals developed by the memory circuit 102 to produce the resultant signal. The resultant signal forms the control signal having a magnitude proportional to the vertical position of the target 22 relative to the camera 10. The control signal thus developed is applied to the summing network 58 to automatically control the D.C. level of the ramp signal developed by the generator 56 with changes in the vertical position of the target 22. The automatic control of the D.C. level of the ramp signal, in turn, controls the time during the complete scanning operation of the monitor 28 at which the pulse signal is developed by the multivibrator 62 to automatically control the vertical positioning of the tracking gate on the viewing screen 30 to follow vertical movement of the target 22 relative to the camera 10.

To provide automatic horizontal tracking control, in the closed loop 100 the pulse output of the multivibrator 44 is applied to the sawtooth wave generator 126. As illustrated by the waveform 166 the generator 126 develops a ramp having a time duration equal to the time duration of the pulse signal generated by the multivibrator 44. The output signal of the generator 126 is amplified by the amplifier 128 and applied to the memory circuit 120 which also receives the trigger pulse from the multivibrator 86. The memory circuit 120 is similar in design and operation to the memory circuit 102 and together with the amplifier 122 and low pass filter 124 develops the aforementioned control signal having a magnitude proportional to the horizontal position of the target 22 as viewed by the camera 10.

More particularly, horizontal movement of the target 22 relative to the camera 10 and the tracking gate causes a change in the time during each tracking gate pulse at which the target signal component 26 appears in the video signal passed by the analog gate 82. Thus, the time during each tracking gate pulse at which a trigger pulse is generated changes in a like manner. Accordingly, by constructing the memory circuit 120 to be responsive to changes in the time during each tracking gate pulse at which the trigger pulse is generated, the memory circuit 120 develops an output signal which is a function of the horizontal position of the target signal component in the video output signal in each horizontal scan of the viewing screen 30 forming the tracking gate and hence the horizontal position of the target 22 relative to the camera 10.

Bascially, to provide means for generating such an output signal the memory circuit 120 is arranged to receive the ramp signals 166 as time base reference signals, the relative zero crossings thereof 167 acting as reference times during the pulse signals from the multivibrator 44 and hence as reference times during the tracking gate pulses as passed by the AND gate 48.

In response to each trigger pulse the memory circuit 120 develops a voltage signal the magnitude and polarity of which is proportional to the time displacement of the trigger pulse from the reference time associated therewith. Thus, the greater the displacement the greater the magnitude of the voltage signal. In addition, trigger pulses which precede their associated reference times are of a first polarity while those which follow are of an opposite polarity. Accordingly, if the target as displayed on the viewing screen is horizontally centered in the tracking gate a resultant zero output voltage is developed during each tracking gate pulse and over the time duration of the series of tracking gate pulses. However, with horizontal movement of the target 22 which causes the target as displayed on the viewing screen 30 to depart horizontally from its centered location, the time during each tracking gate pulse at which the trigger pulses are generated changes in a like manner. Due to such change in the timing of the trigger pulses, the output voltage developed by the memory circuit 120 in response to each trigger pulse changes in magnitude and in sense corresponding to the amount and direction of the horizontal movement of the target 22. In this manner, each discrete voltage pulse developed by the memory circuit 120 as well as a resultant signal over the time duration of the series of tracking gate pulses has a magnitude proportional to the amount of horizontal displacement of the target 22 relative to the camera 10 and a polarity indicative of the direction of the displacement from the center of the tracking gate.

To develop the signal from the discrete voltage signals developed by the memory circuit 120, the output from the memory circuit 120 is amplified by the D.C. amplifier 122 and applied to the low pass filter 124. The low pass filter 124, in effect, integrates the discrete voltage signal developed by the memory circuit 120 to produce the resultant signal. The resultant signal forms the control signal having a magntiude proportional to the horizontal position of the target 22 as viewed by the camera 10.

Similar to the closed loop 98 the control signal thus developed is applied to the summing network 40 to automatically control the D.C. level of the ramp signal developed by the generator 38. The automatic control of the D.C. level of the ramp signal, in turn, controls the time during each horizontal scan of the monitor 28 at which the pulse signals are generated by the multivibrator 44 to automatically control the horizontal positioning of the tracking gate on the viewing screen 30 to follow lateral movement of the target 22 relative to the camera 10.

Thus, the closed loops 98 and 100 function in combination with the gating circuit 79 to automatically control the timed generation of the tracking gate pulses to maintain the target signal component within the portion of the video output signal gated by the video gate 82 and to maintain the tracking gate over the display of the moving target 22 on the viewing screen 30 to provide automatic and continuous tracking of the moving target.

In addition, the control signals developed in the closed loops 98 and 100 as well as the direct current voltage signals generated by the manual control circuits 119 and 138, when energized, are applied to modulators 170 and 172, respectively. The modulator 170 also receives an alternating current signal from an A.C. signal source 174 to provide a controlled alternating signal for the two phase servo motor 18 which selectively controls the tilt of the camera 10 in following the target 22. Similarly, the modulator 172 in addition to receiving a control signal also receives an alternating current from an A.C. signal source 176 to provide a controlled alternating current signal for the two phase servo motor 120 which controls the rotational position of the television camera 10. In this manner, the control signals in addition to providing means for automatically controlling the positioning of the tracking gate on the viewing screen to follow the movements of the target 22 also provide control of the focal direction of the camera 10 to maintain the target and hence the tracking gate at a central position on the screen 30 as illustrated.

In summary then, to track a moving target with the television system of the present invention, an operator, upon viewing a display of the target on the viewing screen, throws the switches 112 and 130 to energize the manual controls 119 and 138. Then by selectively controlling the potentiometers 114 and 136 the tracking gate is centrally positioned over the display of the target. The switches are then returned to their normal position to activate the automatic control provided by the gating circuit 79 and the closed loops 98 and 100. The closed loops and gating circuit then automatically track the target by continuously controlling the position of the tracking gate on the viewing screen as well as the focal direction of the camera 10.

One form of the memory circuit for use in the control circuit of the present invention is represented in schematic form in FIGURE 2. As illustrated, the memory circuit includes a transistor 142 arranged in a grounded emitter configuration for receiving the trigger pulse from the multivibrator 86 at its base terminal 144. The base terminal 144 is also connected through a biasing resistor 145 to a source of negative potential —E. The collector terminal 146 of the transistor 142 is coupled to an output terminal 148 and to a capacitor 150. The transistor 142, thus arranged, forms a transistor switch which is normally in a non-conductive or open condition.

The memory circuit illustrated in FIGURE 2 also includes the transistor 152 arranged in an emiter follower configuration with its emitter terminal 154 coupled to the capacitor 150 and through a biasing resistor 156 to the source of negative potential —E. The collector terminal 158 of the transistor 152 is coupled to a source of positive biasing potential indicated as +E. The transistor 152 is arranged to receive ramp signals, such as generated by the sawtooth wave generators 108 and 126, at its base terminal 160. The base terminal 160 is also coupled by a biasing resistor 162 to the source of positive potential and by a biasing resistor 164 to the source of negative potential. The resistors 162 and 164 are normally of equal value such that the base terminal 160 is generally at ground potential and the emitter terminal 154 slightly negative relative to ground. Thus the transistor 152 is normally in a conductive state.

In operation, if at a time $t_0$ the ramp signal is applied to the memory circuit, the ramp signal is reflected at the emitter terminal 154. However, since at this time the capacitor 150 is connected essentially to an open circuit, the transistor switch 142 being in an open state and an extremely high impedance normally being connected to the output terminal 148, no charge builds up on the capacitor 150. At a time $t_1$ the trigger pulse is applied to the base terminal 144 of the transistor 142, causing the transistor 142 to momentarily switch to a conductive state to complete a charging path for the capacitor 150 through the transistor 142 to ground. The value of the capacitor 150 is chosen such that the time constant of the charging path through the transistor 142 is less than the time duration of the trigger pulse applied to the transistor 142. Accordingly, the capacitor 150 immediately charges to a voltage having a magnitude substantially equal to the magnitude of the sawtooth signal at the time $t_1$ to develop a discrete voltage signal at the output terminal 148.

At the termination of the trigger pulse the transistor 142 returns to its normally non-conductive state to again provide an open circuit connection for the capacitor 150. The capacitor 150 then tends to discharge through the biasing resistor 156 to the source of negative potential −E and through the high load resistance connected to terminal 148. The value of the capacitor 150, the load connected to 148, and the biasing resistor 156, however, are chosen such that the time constant of the discharge path for the capacitor 150 is much greater than the time required for a complete scanning operation of the TV monitor. Thus, the voltage is maintained on the capacitor 150 and at the output terminal 148 until the occurrence of the next following trigger pulse at the base terminal 144 of the transistor 142. During the next trigger pulse the capacitor 150 is either charged or discharged to a new voltage level determined by the time of the trigger pulse relative to the ramp signal and hence the time during the tracking gate pulse at which the target signal component appears in the video signal passed by the analog gate 82.

When employing the memory circuit illustrated in FIGURE 2 as the memory circuit 120, the time duration of the ramp signal applied to the transistor 152 is equal to the time duration of each tracking gate pulse. Since a single trigger pulse is generated during each tracking gate pulse the capacitor 150 will charge to develop a single discrete voltage signal at the output terminal 148 during each ramp signal.

The ramp signal, in effect, functions as a time base signal having a reference time corresponding to its relative zero crossing 165. As previously described, the ramp signal determines the magnitude and polarity of the output voltage signal as a function of the arrival time of the target signal component in the video output signal during each tracking gate pulse as represented by the timed arrival of a trigger pulse at the transistor 142. Since the zero crossing is at the time center of the tracking gate pulse, the magnitude of the output voltage is a function of the time displacement of the target signal component from the time center of the tracking gate pulse and hence is proportional to the horizontal displacement of the display of the target from the center of the tracking gate. Due to the time varying nature of the amplitude of the ramp signal, the polarity of the output voltage is indicative of the direction of the displacement of the target from the center of the tracking gate. Thus, when utilizing the circuit of FIGURE 2 as the memory circuit 120, each output voltage generated thereby is proportional to the horizontal position of the target 22 as viewed by the camera 10. Accordingly, by time averaging the discrete output voltages in the low pass filter 124 the control signal is developed which has the magnitude proportional to the horizontal position of the target 22.

Similarly, when employing the memory circuit illustrated in FIGURE 2 as the memory circuit 102, the time duration of the ramp signal applied to the transistor 152 is equal to the time duration of the series of tracking gate pulses during a complete scanning of the viewing screen 30. Since a series of tracking gate pulses are generated during the time duration of such a ramp signal the capacitor 150 will charge and recharge several times to develop a series of discrete voltage signals at the output terminal 148 during each ramp signal.

The ramp signal, in effect, functions as a time base signal with its zero crossing 165 functioning as a reference time during the series of tracking gate pulses. Due to the time varying nature of the ramp signal about the reference time, trigger pulses received by the transistor 142 prior to the reference time develop output voltage signals having a first polarity and a magnitude determined by the time displacement from the reference time while trigger pulses received at the transistor 142 after the reference time have an opposite polarity and a magnitude determined by the time displacement of the trigger pulses from the reference time. As previously described in connection with the memory circuit 102 of FIGURE 1, as the vertical position of the target 22 changes relative to the camera 10, a corresponding change occurs in the timing of the trigger pulses generated during the series of tracking gate pulses. In particular, a change occurs in the number of tracking gate pulses preceding and following the reference time. Accordingly, over the time duration of the series of tracking gate pulses the number of output voltage signals developed by the memory circuit having one polarity are greater than the number of output voltage signals of an opposite polarity. This produces an overall resultant output voltage signal having a magnitude and polarity which is directly proportional to the vertical displacement of the visual indication of the target from the center of the tracking gate and is formed by use of the D.C. amplifier 104 and the low pass filter 106 as described in connection with FIGURE 1.

Thus, when utilizing the memory circuit of FIGURE 2 as the memory circuit 102 a plurality of discrete output voltage signals are developed, the resultant of which is directly proportional to the vertical position of the target 22 as viewed by the camera 10. Accordingly, by employing the circuitry of FIGURE 2 as the memory circuits 102 and 120 in FIGURE 1, means are provided for generating the control signals having magnitudes proportional to the horizontal and vertical position of the target 22 as viewed by the camera to provide automatic control of the position of the tracking gate to follow movements of the target 22 relative to the camera 10.

What is claimed is:

1. An automatic tracking television system, comprising:
a television camera for developing a video output signal including a detectable target signal component developed from a target viewed by the camera;
a television monitor having a viewing screen;
means for applying the video output signal to the monitor;
a source of horizontal and vertical synchronizing pulses for synchronizing the scanning operation of the monitor to the camera;
means receiving the horizontal synchronizing pulses for developing a first pulse signal of predetermined time duration during each horizontal scan of the viewing screen;
means receiving the vertical synchronizing pulses for developing a second pulse signal of a predetermined time duration during each complete scanning of the viewing screen;
means for developing a tracking gate pulse upon a simultaneous occurrence of the first and second pulse signals;
means for applying the tracking gate pulse to the monitor to develop a movable tracking gate on the viewing screen;
means responsive to each tracking gate pulse for passing a portion of the video output signal;
means for receiving said portion of the video output signal to develop a third pulse signal upon the arrival of a target signal component in said portion;
a first servo control responsive to the first and third pulse signals for controlling the time during each horizontal scan of the viewing screen at which the first pulse signal is generated in accordance with horizontal changes in the position of the target viewed by the camera;
and a second servo control responsive to the second and third pulse signals for controlling the time during each complete scanning of the viewing screen at which the second pulse signal is generated in accordance with vertical changes in the position of the target viewed by the camera to position and maintain the target within the tracking gate on the viewing screen of the monitor.

2. The apparatus defined in claim 1 including motor drive means for controlling the focal direction of the camera and means for controlling the motor drive means in response to the first and second servo controls such that camera continuously views the target.

3. An automatic tracking television system, comprising:
a television camera for developing a video output signal including a detectable target signal component developed by a target viewed by the camera;
a television monitor having a viewing screen;
means for applying the video output signal to the monitor;
a source of horizontal and vertical synchronizing pulses for synchronizing the scanning operation of the monitor to the camera;
means receiving the horizontal synchronizing pulses for developing a first pulse signal of predetermined time duration during each horizontal scan of the viewing screen;
means receiving the vertical synchronizing pulses for developing a second pulse signal of a predetermined time duration during each complete scanning of the viewing screen;
means for developing a tracking gate pulse upon a simultaneous occurrence of the first and second pulse signals;
means for applying the tracking pulse to the monitor to develop a movable tracking gate on the viewing screen;
means for developing a third pulse signal in response to the target signal component in the video output signal;
means receiving the first and third pulse signals for developing a first control signal having a magnitude which is a function of the time at which the target signal component appears in the video output signal during the horizontal scan of the viewing screen;
means receiving the second and third pulse signals for developing a second control signal having a magnitude which is a function of the time at which the target signal component appears in the video output signal during a complete scan of the viewing screen;
means receiving the first control signal for automatically controlling the time during each horizontal scan of the viewing screen at which the first pulse signal is generated;
and means receiving the second control signal for automatically controlling the time during each complete scanning of the viewing screen at which the second pulse signal is generated to position and maintain the target within the tracking gate on the viewing screen of the monitor.

4. An automatic tracking television system comprising:
a television camera for developing a video output signal including a detectable signal component developed from a target viewed by the camera;
a television monitor having a viewing screen;
means for applying the video output signal to the monitor;
a source of horizontal and vertical synchronizing pulses for synchronizing the scanning operation of the monitor to the camera;
means receiving the horizontal synchronizing pulses for developing a first pulse signal of predetermined time duration during each horizontal scane of the viewing screen;
means receiving the vertical synchronizing pulses for developing a second pulse signal of predetermined time duration during each complete scanning of the viewing screen, the time duration of the second pulse signal being substantially greater than the time duration of the first pulse signal;
means for developing a tracking gate pulse upon a simultaneous occurrence of the first and second pulse signals such that a timed series of tracking gate pulses are developed during each complete scan of the viewing screen;
means for applying the tracking gate pulses to the monitor to develop a movable tracking gate on the viewing screen;
gating means receiving the series of tracking gate pulses for passing a portion of the video output signal during each tracking gate pulse;
means coupled to the gating means for receiving said portion of the video output signal to develop a third pulse signal upon the arrival of a target signal component in said portion such that a series of third pulses are developed during the series of tracking gate pulses;
means receiving the first and third pulses for developing a first control signal having a magnitude which is a function of the time during each tracking gate pulse at which the third pulse is developed;
means receiving the second and third pulses for developing a second control signal having a magnitude which is a function of a difference between the number of third pulses preceding and following a predetermined reference time during the series of tracking gate pulses;
means receiving the first control signal for automatically controlling the time during each horizontal scan of the viewing screen at which the first pulse is generated;
and means receiving the second control signal for automatically controlling the time during each complete scanning of the viewing screen at which the second pulse signal is generated to position and maintain the target within the tracking gate on the viewing screen of the monitor.

5. The apparatus defined in claim 4 including motor drive means for controlling the focal direction of the camera and means for controlling the motor drive means in response to the first and second control signal such that the camera continuously views the target.

6. The apparatus defined in claim 5 including manually controllable means for initially adjusting the time during each horizontal scan of the viewing screen at which the first pulse is generated and manually controllable means for initially adjusting the time during each complete scanning of the viewing screen at which the second pulse is generated to initially position the tracking gate on the viewing screen over a visual indication of the target.

7. An automatic tracking television system, comprising:
a television camera for developing a video output signal including a detectable target signal component produced by a target viewed by the camera;
a television monitor having a viewing screen;
a source of horizontal and vertical synchronizing pulses for synchronizing the scanning operation of the monitor to the camera;
means for applying the video output signal to the monitor;
means receiving the horizontal synchronizing pulses for developing a first pulse signal of predetermined time duration during each horizontal scan of the viewing screen;
means receiving the vertical synchronizing pulses for developing a second pulse signal of a predetermined time duration during each complete scanning of the viewing screen, the time duration of the second pulse signal being substantially greater than that of the first pulse signal;
means for developing a tracking gate pulse upon a simultaneous occurrence of the first and second pulse signals such that a time series of tracking gate pulses are developed during each complete scanning of the viewing screen;

means for applying the tracking gate pulse to the monitor to develop a movable tracking gate on the viewing screen;

gating means receiving the series of tracking gate pulses for gating a portion of the video output signal during each tracking gate pulse;

means having a predetermined threshold voltage coupled to the gating means for developing a third pulse signal at the leading edge of the target signal component in each gated portion of the video output signal which exceeds the threshold voltage such that a series of third pulses are developed during the series of tracking gate pulses;

means receiving the first and third pulse signals for developing a first substantially direct current signal the magnitude of which is proportional to the time during the tracking gate pulses at which the third pulses are developed;

means receiving the second and third pulse signals for developing a second substantially direct current signal the magnitude of which is proportional to a difference between the number of third pulses preceding and following a predetermined reference time during the second pulse signal;

means receiving the first direct current signal for automatically controlling the time during each horizontal scan of the viewing screen at which the first pulse signal is generated;

and means receiving the second direct current signal for automatically controlling the time during each complete scanning of the viewing screen at which the second pulse signal is generated to maintain the target within the tracking gate on the viewing screen of the monitor.

8. The apparatus defined in claim 7 including manually controllable means for initially adjusting the time during each horizontal scan of the viewing screen at which the first pulse is generated and manually controllable means for initially adjusting the time during each complete scanning of the viewing screen at which the second pulse signal is generated to initially position the tracking gate on the viewing screen over a visual indication of the target.

9. The apparatus defined in claim 7 including motor drive means for controlling the focal direction of the camera and means for controlling the motor drive means in response to the first and second direct current signals such that the camera continuously views the target.

10. The apparatus defined in claim 7 wherein the means for developing the first and second direct current signals each include means for maintaining the magnitude of the first and second direct current signals generated during a given series of tracking gate pulses at a substantially constant value until the generation of the next following series of tracking gate pulses.

11. The apparatus defined in claim 7 wherein the means for developing the first direct current signal comprises a first capacitor, means receiving the first and third pulse signals for charging the first capacitor to a voltage level determined by the time during a tracking gate pulse at which a third pulse signal is developed, and means for maintaining a substantially uniform voltage on the first capacitor until the next following tracking gate pulse is generated, and wherein the means for developing the second direct current signal comprises a second capacitor, means for charging the second capacitor during each simultaneous occurrence of the second and third pulse signals to voltage levels determined by the times during the series of tracking gate pulses at which the third pulses are developed relative to a reference time during the second pulse signal, and means for averaging the voltages on the second capacitor during each series of third pulse signals to develop the second direct current signal.

12. The apparatus defined in claim 7 wherein the means for developing the first direct current signal comprises a memory circuit including a first capacitor and first normally open switch responsive to pulse signals for connecting the first capacitor to a source of reference potential, means receiving the first pulse signal for developing a first ramp signal during the first pulse signal, means for applying the first ramp signal to the first capacitor, means for applying a third pulse signal to the first normally open switch to complete a charging path for the first capacitor thereby charging the first capacitor to a voltage determined by the magnitude of the first ramp signal at the closing of the first normally open switch, and means coupled to the first capacitor for maintaining the value of the voltage on the first capacitor until the next following third pulse signal, and wherein the means for developing the second direct current signal comprises a memory circuit including a second capacitor and a second normally open switch responsive to pulse signals for connecting the second capacitor to a source of reference potential, means receiving the second pulse signal for developing a second ramp signal during the second pulse signal, means for applying the second ramp signal to the second capacitor, means for applying the third pulse signal to the second normally open switch to complete a charging path for the second capacitor thereby charging the second capacitor to a voltage determined by the magnitude of the second ramp signal at the closing of the second normally open switch, means coupled to the second capacitor for maintaining the value of the voltage on the second capacitor until the next following third pulse signal, and means for averaging the voltage on the second capacitor during each series of third pulse signals.

References Cited by the Examiner

UNITED STATES PATENTS

| | | | |
|---|---|---|---|
| 2,403,975 | 7/1946 | Graham | 178—6.8 |
| 2,774,964 | 12/1956 | Baker | 178—6.8 |
| 3,057,953 | 10/1962 | Guerth | 178—6.8 |

DAVID G. REDINBAUGH, *Primary Examiner.*

R. M. HESSIN, B. V. SAFOUREK, *Assistant Examiners.*